(12) United States Patent
Froissard et al.

(10) Patent No.: US 10,627,652 B2
(45) Date of Patent: Apr. 21, 2020

(54) EYEWEAR ARTICLE SIDE SHIELD RETAINER

(71) Applicant: HOYA OPTICAL LABS OF AMERICA, INC., Lewisville, TX (US)

(72) Inventors: Laurent Froissard, Cranston, RI (US); Dana R. Dixon, Laguna Hills, CA (US)

(73) Assignee: HOYA OPTICAL LABS OF AMERICA, INC., Lewisville, TX (US)

( * ) Notice: Subject to any disclaimer, the term of this patent is extended or adjusted under 35 U.S.C. 154(b) by 283 days.

(21) Appl. No.: 15/032,326

(22) PCT Filed: Oct. 21, 2014

(86) PCT No.: PCT/US2014/061443
§ 371 (c)(1),
(2) Date: Apr. 27, 2016

(87) PCT Pub. No.: WO2015/065752
PCT Pub. Date: May 7, 2015

(65) Prior Publication Data
US 2016/0274382 A1 Sep. 22, 2016

Related U.S. Application Data

(60) Provisional application No. 61/898,062, filed on Oct. 31, 2013.

(51) Int. Cl.
*G02C 11/00* (2006.01)
*G02C 5/00* (2006.01)
*G02C 13/00* (2006.01)

(52) U.S. Cl.
CPC .............. *G02C 11/12* (2013.01); *G02C 5/008* (2013.01); *G02C 13/001* (2013.01)

(58) Field of Classification Search
USPC ................................................ 351/122; 2/13
See application file for complete search history.

(56) References Cited

U.S. PATENT DOCUMENTS 545,504 A 9/1895 Hoover et al.
1,295,128 A 2/1919 Day
(Continued)

FOREIGN PATENT DOCUMENTS

CN 102445768 5/2012
GB 1139751 1/1969
(Continued)

OTHER PUBLICATIONS

Safety Optical Service Product Installation, [retrieved from the internet on Nov. 6, 2013], URL <http://www.sideshield.com/installation3.php>, pp. 2.
(Continued)

*Primary Examiner* — William R Alexander
*Assistant Examiner* — Gary W O'Neill
(74) *Attorney, Agent, or Firm* — Kilpatrick Townsend & Stockton LLP (57) ABSTRACT

A side shield retainer kit is provided. In an exemplary embodiment, a side shield retainer kit includes a spring bar having first and second engagement surfaces and an outer surface including a sloped portion. A cylindrical polymeric retainer having an outer major surface and an inner major surface is positionable around the spring bar and is configured to secure the spring bar to a spectacle side shield upon exposure to heat.

23 Claims, 3 Drawing Sheets

(56) References Cited

U.S. PATENT DOCUMENTS

| | | | |
|---|---|---|---|
| 2,718,695 A | 9/1955 | Carl | |
| 3,370,317 A | 2/1968 | Marchione | |
| 3,505,679 A | 4/1970 | Bennett | |
| 3,721,490 A | 3/1973 | Prince | |
| 5,056,735 A | 10/1991 | Gelardi et al. | |
| 5,235,727 A | 8/1993 | McCloskey | |
| 5,402,189 A * | 3/1995 | Gill | A61F 9/029 2/13 |
| 5,414,906 A * | 5/1995 | Kren | G02C 3/04 24/11 S |
| 5,543,864 A | 8/1996 | Hirschman | |
| 5,558,351 A | 9/1996 | Hunter | |
| 5,647,603 A | 7/1997 | Kass et al. | |
| 5,748,278 A | 5/1998 | Simmons, Sr. | |
| 5,798,815 A | 8/1998 | Hirschman | |
| 5,877,837 A | 3/1999 | Hayes | |
| 5,940,161 A | 8/1999 | Hirschman | |
| 6,007,019 A | 12/1999 | Lynch | |
| 6,007,196 A * | 12/1999 | Saba | G02C 7/16 2/13 |
| RE37,530 E | 1/2002 | Hirschman | |
| 6,393,609 B1 | 5/2002 | Simmons, Sr. | |
| 6,540,347 B1 | 4/2003 | Radziwon | |
| 6,666,554 B2 | 12/2003 | Mulvey | |
| 6,715,873 B2 | 4/2004 | Nahmias | |
| 6,726,321 B2 | 4/2004 | Radziwon | |
| 6,910,767 B2 | 6/2005 | Froissard | |
| 8,087,774 B2 | 1/2012 | Yang | |
| 8,087,776 B2 | 1/2012 | Pulito | |
| 8,210,675 B1 * | 7/2012 | Leshe | G02C 11/00 24/3.3 |
| 8,393,731 B2 | 3/2013 | Jung | |
| 8,777,406 B2 | 7/2014 | Sugihara | |
| D740,351 S | 10/2015 | Froissard | |
| 2003/0223032 A1 * | 12/2003 | Gagnon | G02C 1/08 351/92 |
| 2005/0162609 A1 | 7/2005 | Jung | |
| 2006/0268217 A1 | 11/2006 | Teng | |
| 2008/0304005 A1 | 12/2008 | DiChiara | |
| 2009/0089984 A1 * | 4/2009 | Warren | G02C 3/04 24/457 |
| 2010/0296046 A1 | 11/2010 | Yang | |
| 2013/0001008 A1 * | 1/2013 | Corona | G02C 11/00 181/129 |

FOREIGN PATENT DOCUMENTS

| | | |
|---|---|---|
| GB | 1308587 | 2/1973 |
| JP | 2012-078588 | 4/2012 |
| KR | 10-2009-0065637 | 6/2009 |
| TW | I657286 | 4/2019 |
| WO | WO 2007/109309 | 9/2007 |
| WO | WO 2009/008586 | 1/2009 |

OTHER PUBLICATIONS

USA Workforce Safety Side Shields, [retrieved from the internet on Nov. 6, 2013], URL <http://www.artcraftoptical.com/products/safety/shields/side-shields.htm>, pp. 2.

International Search Report for PCT International Application No. PCT/US2014/061443, dated Jan. 29, 2015, 3 pgs.

TW103137664, "Notice of Decision to Grant", dated Dec. 11, 2018, 3 pages.

TW103137664, "Office Action", dated Jun. 12, 2018, 11 pages.

* cited by examiner

EYEWEAR ARTICLE SIDE SHIELD RETAINER

CROSS REFERENCE TO RELATED APPLICATIONS

This application is a national stage filing under 35 U.S.C. 371 of PCT/US2015/065752, filed Oct. 21, 2014, which claims the benefit of U.S. Application No. 61/898,062, filed Oct. 31, 2013, the disclosure of which is incorporated by reference in its/their entirety herein.

TECHNICAL FIELD

This disclosure relates to a retainer for an eyewear article side shield, in particular a retainer assembly including a spring bar having first and second engagement surfaces and a polymeric retainer that may be positioned around the spring bar and a temple piece of an eyewear article to secure a side shield to an eyewear article.

BACKGROUND

Eyewear articles, such as eyewear intended to correct a person's vision, safety glasses intended to protect a person's eyes or face from harm, cosmetic eyewear, and other spectacles, are widely known. Such eyewear often rests on the nose, and above or on each ear of a user. Such eyewear may include side shields that provide lateral coverage of a user's face and/or eyes.

Various mechanisms have been provided for attaching side shields to eyewear. For example, prior devices have secured side shields with elastic bands, rivets, or screws. There remains a continued need for easy, secure, and cost-effective attachment of side shields to eyewear.

SUMMARY

The present disclosure provides an eyewear article side-shield retainer kit including a spring bar having first and second engagement surfaces and an outer surface including a sloped portion. The kit further includes a cylindrical polymeric retainer having an outer major surface and an inner major surface and positionable around the spring bar and an eyewear article temple piece. The first and second engagement surfaces are configured to contact an outer surface of an eyewear article temple piece, and the polymeric retainer is configured to secure the spring bar to a spectacle side shield upon exposure to heat.

The present disclosure further provides a method for retaining a side-shield on an eyewear article including steps of positioning a side shield and spring bar proximate an eyewear article temple portion, the spring bar including first and second engagement surfaces and an outer surface including a sloped portion, positioning a cylindrical polymeric retainer around at least a portion of the sloped portion of the spring bar and the temple portion; and shrinking the polymeric retainer to secure the spring bar to the eyewear article temple portion. In an exemplar embodiment, the step of shrinking the polymeric retainer comprises heating the polymeric retainer.

The above summary of the present invention is not intended to describe each disclosed embodiment or every implementation of the present invention. The Figures and the Detailed Description, which follow, more particularly exemplify illustrative embodiments.

BRIEF DESCRIPTION OF DRAWINGS

The present invention will be further explained with reference to the appended Figures, wherein like structure is referred to by like numerals throughout the several views, and wherein.

While the above-identified figures set forth various embodiments of the disclosed subject matter, other embodiments are also contemplated. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

The present disclosure provides an eyewear article side shield retainer, kit and method that may be used to secure side shields to eyewear articles. The eyewear article side shield retainer kit includes a spring bar having first and second engagement surfaces and a polymeric retainer positionable around an eyewear article temple portion and the spring bar, and that is configured to secure the spring bar to an eyewear article side shield. In an exemplary embodiment, the spring bar includes an outer surface including a sloped portion, and the polymeric retainer is configured to contact the sloped portion to secure the spring bar to the spectacle side shield when exposed to heat. An eyewear article side shield retainer including a spring bar and a polymeric retainer provides a robust attachment of a side shield on an eyewear article while being easily assembled.

Figure 1:
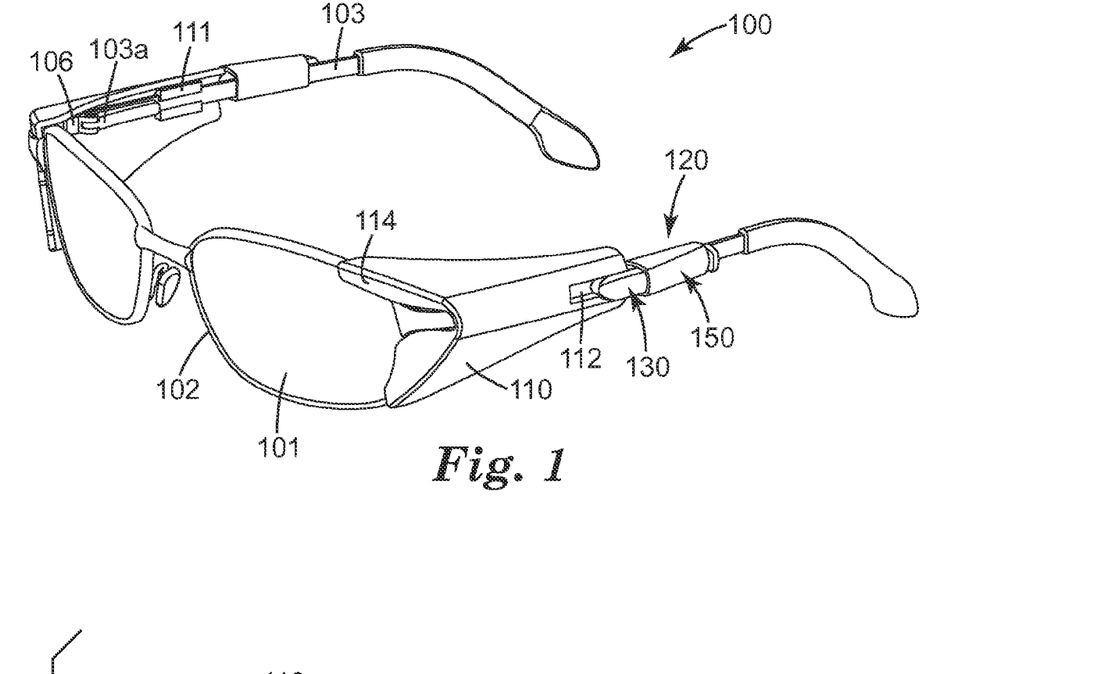
FIG. 1 is a perspective view of an eyewear article including an eyewear article side shield retainer kit according to the present disclosure.

FIG. 1 shows an exemplary embodiment of an eyewear article 100 including side shields 110 attached to eyewear article 100 with an exemplary side shield retainer assembly 120 including a spring bar 130 and polymeric retainer 150. Eyewear article 100 may include traditional eyewear components including one or more lenses 101 and/or a frame 102. Eyewear article 100 includes temple pieces 103 extending rearwardly from a front of eyewear article 100. When positioned for use, eyewear article 100 is positioned generally in front of the eye or eyes of a user to provide the intended functionality of eyewear article 100. The one or more lenses 101 interact with a user's field of vision, or substantially block the user's eyes and portions of a user's face from external elements.

In an exemplary embodiment, first end portions 103a of temple pieces 103 may be secured to an attachment portion 106 of the one or more lenses 101, frame, or other suitable feature of eyewear article 100. Temple piece 103 may be secured to attachment portion 106 by any suitable means known in the art. For example, temple piece 103 may be rotatably secured with a hinge that permits pivotal motion of temple piece 103 about an axis at various positions between an open and closed position. This may be achieved by first end portion 103a of temple piece 103 including features that mate with corresponding features of the one or more lenses 101, a frame, or other suitable features of eyewear article 100, and are secured in a rotatable engagement with a screw, pin, or other fastener as known in the art. Temple piece 103 may also be attached using a snap fit attachment, for example. In another exemplary embodiment, eyewear article 100 may or may not include a frame, and temple pieces 103 may be attached to attachment points of the one or more lenses 101.

Eyewear article 100 includes side shields 110. Side shields 110 are non-integral to eyewear article 100 and temple pieces 103. In an exemplary embodiment, side shields 110 provide additional coverage of the eyes and face of a user, and reduce the size of a gap between eyewear article 100 and a user to minimize space for debris to enter between eyewear article 100 and the face of a user. Side shields 110 may be suitable for use with prescription eyewear.

Side shields 110 are attached to temple pieces 103 of eyewear article 100 by an exemplary side shield retainer assembly 120. In an exemplary embodiment, side shield retainer assembly 120 includes spring bar 130 and a polymeric retainer 150. Polymeric retainer 150 is positioned around spring bar 130 and temple piece 103 to secure spring bar 130 to temple piece 103. In an exemplary embodiment, polymeric retainer 150 presses spring bar 130 against temple piece 103 as further described herein. Spring bar 130 interacts with one or more complementary features of side shield 110 to retain the side shield in position on temple piece 103. Side shield 110 may include one or more features, such as a channel, groove, or other complementary feature 111, that interact with temple piece 103 and/or a flange 114 that interacts with frame 102 or lens 101 to prevent rearward movement of side shield 110.

Figure 2:
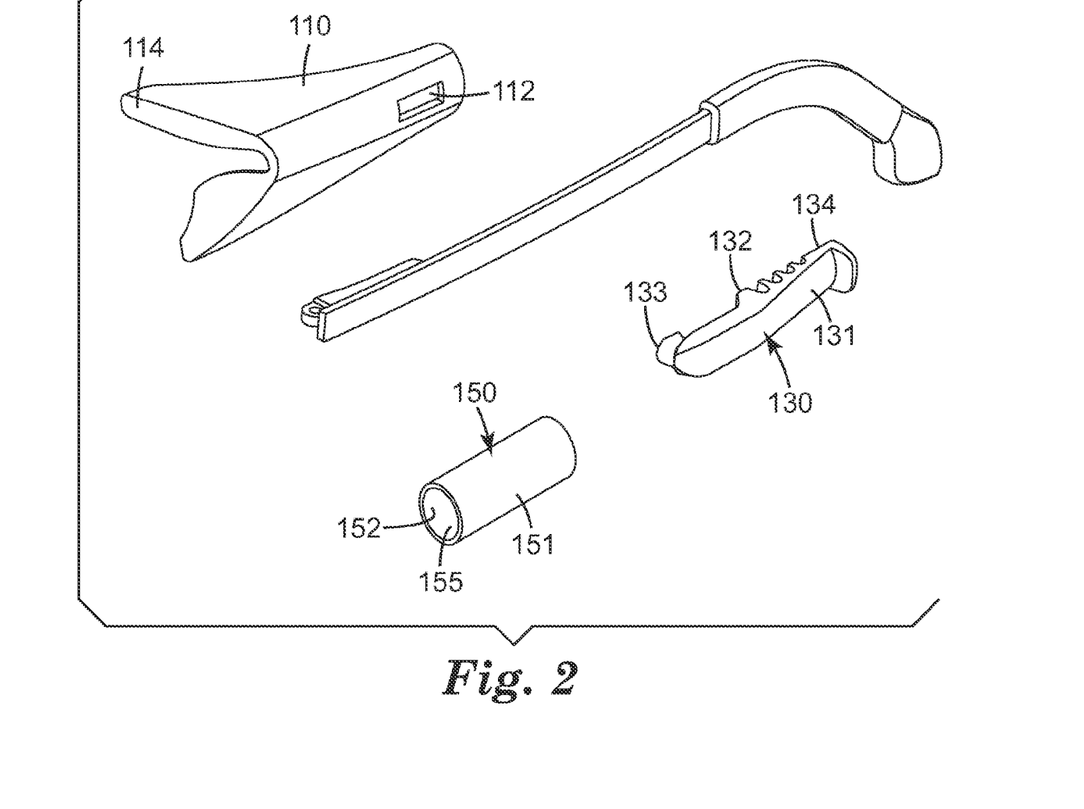
FIG. 2 is a partial exploded view of spectacles including an eyewear article side-shield retainer kit according to the present disclosure.

FIG. 2 shows unassembled components of an exemplary side shield retainer 120. Spring bar 130 may be positioned proximate temple piece 103, for example such that one or more engagement surfaces 133, 134 of spring bar 130 contact temple piece 103, such as an outer surface of temple piece 103, and/or a portion of spring bar 130 is positioned adjacent a complementary feature of side shield 110. In an exemplary embodiment, spring bar 130 contacts temple piece 103 through an opening 112 defined by side shield 110.

Polymeric retainer 150 includes an outer major surface 151, an inner major surface 152 and defines a central opening 155. In an exemplary embodiment, polymeric retainer forms a generally cylindrical shape before being secured. Polymeric retainer 150 may be positioned around spring bar 130 and temple piece 103 by passing temple piece 103 and spring bar 130 through central opening 155 of polymeric retainer 150.

Polymeric retainer 150 exhibits a length in its longest direction that may be selected based on the geometry of spring bar 130. In various exemplary embodiments, polymeric retainer 150 has a length between 10 mm and 40 mm, 15 mm and 30 mm, or of about 20 mm.

Figure 3:
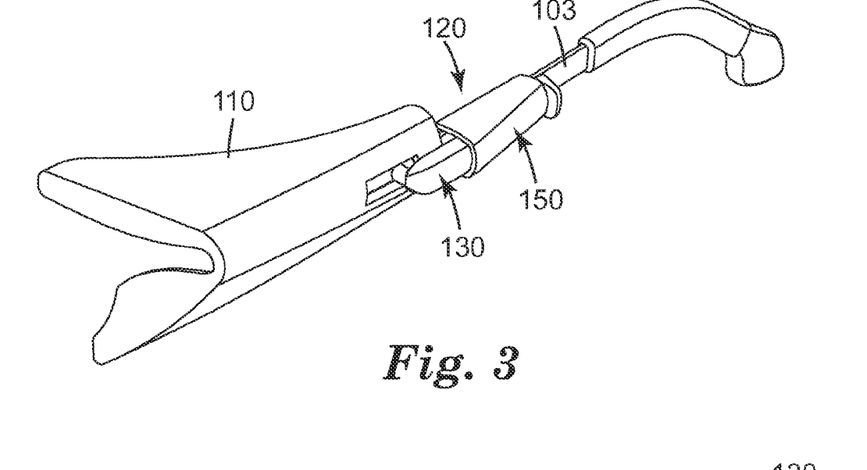
FIG. 3 is a partial assembled view of spectacles including an eyewear article side-shield retainer kit according to the present disclosure.

As shown in FIG. 3, polymeric retainer may be secured to spring bar 130 and temple piece 103 after positioning polymeric retainer 150 around spring bar 130 and temple piece 103, for example. In an exemplary embodiment, application of heat to polymeric retainer 150 causes polymeric retainer 150, and a diameter of central opening 155, to shrink. Any suitable source of heat may be used to cause polymeric retainer 150 to shrink, including hot air from a heat gun, for example. Polymeric retainer 150 thus may conform to and snugly contact spring bar 130 and/or temple piece 103, pressing spring bar 130 against temple piece 103.

Figure 4:
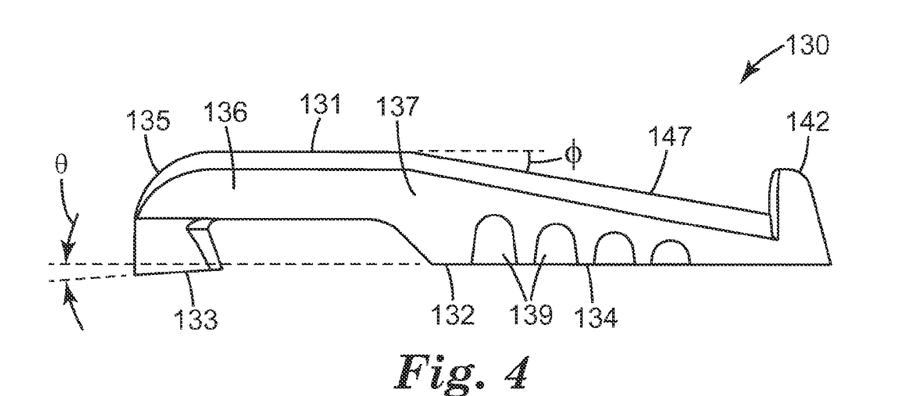
FIG. 4 is a side view of an exemplary spring bar according to the present disclosure.

FIG. 4 is a side view of an exemplary spring bar 130 in a neutral, unsecured configuration. In an exemplary embodiment, spring bar 130 includes an outer surface 131, an inner surface 132, and first and second side surfaces, 137, 138. Inner surface 132 is configured to be positioned adjacent temple piece 103 when spring bar 130 is secured to eyewear article 100. Spring bar 130 includes a first engagement surface 133 and a second engagement surface 134, and in an exemplary embodiment, first and second engagement surfaces 133, 134 form a portion of inner surface 132. First and second engagement surfaces contact temple piece 103, side shield 110, and/or other portions of eyewear article 100 when secured to eyewear article 100.

In an exemplary embodiment, outer surface 131 of spring bar 130 includes a sloped portion 147 having an angle φ relative to the first engagement surface or relative to a horizontal plane. A sloped portion having an angle φ may assist in retaining spring bar 130 and side shield 110 to temple piece 103 when secured by a polymeric retainer. In various exemplary embodiments, an angle φ between approximately 2° and 15°, or between approximately 5° and 12°, or of approximately 10° provides additional security without requiring an excessively bulky spring bar 130.

In some exemplary embodiments, spring bar 130 is configured to rotate, flex, and/or compress such that spring bar 130 provides a preload or exerts a restoring force when secured to eyewear article 100 by polymeric retainer 150. For example, first and second engagement surfaces 133, 134 move relative to one another between a neutral, unsecured configuration and a secured configuration. First engagement surface 133 may have a first relative position to second engagement surface 134 when in a neutral, unsecured configuration, and a second relative position to second engagement surface 134 when secured. Relative motion of first and second engagement surfaces, for example due to rotating, flexing, and/or compressing of part or all of pivot arm 136 creates a loading on spring bar 130 and an associated restoring force acting on polymeric retainer 150, temple piece 103, side shield 110, and/or other portions of eyewear article 100. The force resulting from a loaded spring bar 130 provides a clamping force on temple piece 103, for example, and facilitates a robust attachment of side shield 110.

In an exemplary embodiment, spring bar 130 includes a pivot arm 136 that allows first and second engagement surfaces 133 and 134 to rotate relative to one another from a first relative position in an unsecured configuration and a second relative position when secured. Pivot arm 136, and/or other portions of spring bar 130, flex as spring bar 130 is secured by polymeric retainer 150. The flexure, rotation and/or compression of spring bar 130 and pivot arm 136, and a resulting force exerted when spring bar 130 is secured by polymeric retainer 150, may be controlled based on the material and geometry of spring bar 130, as described further herein.

In an exemplary embodiment, first engagement surface 133 has a first angle θ relative to second engagement surface 134 when spring bar 130 is in a neutral configuration, unsecured by polymeric retainer 150. In various exemplary embodiments, an angle θ between approximately 1° and 15°, 2° and 10°, or 3° and 7° may result in a spring bar that exerts a desired force when secured by polymeric retainer 150. When spring bar 130 is secured, first and second engagement surfaces 133, 134 rotate relative to one another as a result of a force exerted by polymeric retainer 150 drawing spring bar 130 towards temple piece 103, and an angle of first engagement surface 133 relative to second engagement surface 134 changes. In an exemplary embodiment, first engagement surface 133 has a second angle β relative to the second engagement surface when secured by polymeric retainer 150. In various exemplary embodiments, θ is greater than β due to relative motion of first and second engagement surfaces 133, 134. In an exemplary embodiment in which temple piece 103 is substantially straight, for example having a radius of curvature approaching infinity, β may be approximately 0°. In some exemplary embodiments, β may be between approximately 0° and 1°, or other suitable angle based on a curvature of temple piece 103.

In some exemplary embodiments, θ and β are approximately 0° or nearly 0° such that spring bar 130 does not, or only slightly, rotates, flexes, and/or compresses between neutral and secured configurations.

In various exemplary embodiments, spring bar 130 may create a force at least in part due to compression of a material of spring bar 130 at one or both of first and second engagement surfaces 133, 134. In one exemplary embodiment, spring bar 130 includes a material, such as foam, rubber, acrylic foam tape such as VHB™ tape available from 3M Co. of St. Paul, Minn., or other suitable material, that is compressible by polymeric retainer 150. When secured, the compressible material is compressed from a neutral, unsecured configuration, in which the compressible material has a first thickness, and a secured configuration in which the compressible material has a second thickness that is less than the first thickness. The compressed material functions similar to a spring, and creates a force acting on polymeric retainer 150, temple piece 103, side shield 110, and/or other portions of eyewear article 100. The force resulting from the compressed material provides additional security and facilitates a robust attachment of side shield 110.

Spring bar 130 may include various features to provide additional security or ease of assembly. In an exemplary embodiment, side surfaces 137, 138, and/or outer surface 131, include one or more ridges, depressions, textures, and/or microreplicated features 139, best viewed in FIG. 4, to create additional friction and/or greater surface contact between spring bar 130 and polymeric retainer 150. For example, polymeric retainer 150 may, at least partially, conform to the one or more ridges, depressions, textures, and/or microreplicated features 139 of spring bar 130 such that friction is increased and relative motion between spring bar 130 and polymeric retainer 150 is limited. In some embodiments, a mechanical interlock results from the polymeric retainer conforming to the contours of features 139.

Figure 6:
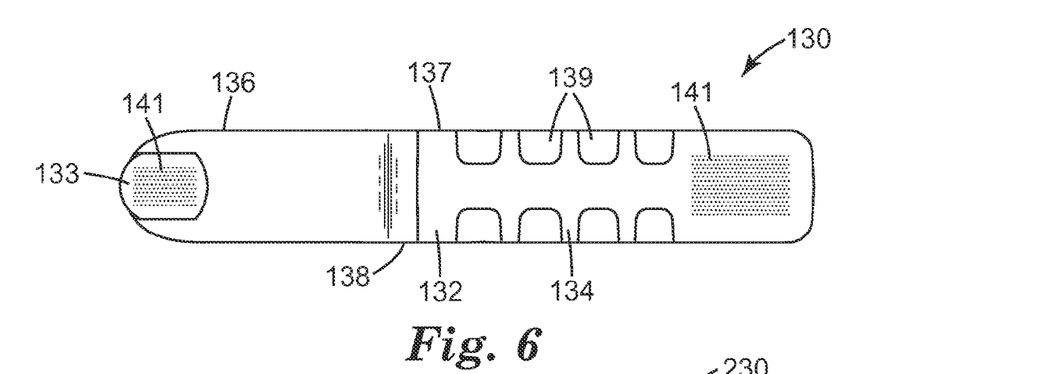
FIG. 6 is a bottom view of an exemplary spring bar according to the present disclosure.

As viewed in FIG. 6, first and second engagement surfaces 133, 134 may include one or more ridges, depressions, textures, and/or microreplicated features 141 that interact with temple pieces 103 of eyewear article 100. In an exemplary embodiment, one or more ridges, depressions, textures, and/or microreplicated features 141 may create additional friction between spring bar 130 and temple pieces 103 when spring bar 130 is secured to temple piece 103 by polymeric retainer 150. In some exemplary embodiments, spring bar 130 may include one or more ridges, depressions, textures, and/or microreplicated features 141 complementary to a shape of temple pieces 103 configured to limit relative motion between spring bar 130 and temple pieces 103 when secured by polymeric retainer 150, such as a depression configured to receive a portion of temple piece 103 having a complementary shape.

Spring bar 130 may be formed from a material having suitable properties to allow spring bar 130 to be secured by polymeric retainer 150. In an exemplary embodiment, spring bar 130 is made from a glass fiber reinforce polyamide such as a material having the trade name HYLON available from Ravago Manufacturing of Houston, Tex., or a material having the trade name ZYTEL from DuPont Performance Polymers of Wilmington, Del. Other suitable materials include polycarbonates, polyesters, polyamides, acetals, thermoplastics, other suitable materials as known in the art, and suitable combinations of such materials. In an exemplary embodiment, spring bar 130 is made from a material having a flexural modulus between 1000 MPa and 9500 MPa, 2000 MPa and 6000 MPa, or about 4000 MPa.

Figure 5:
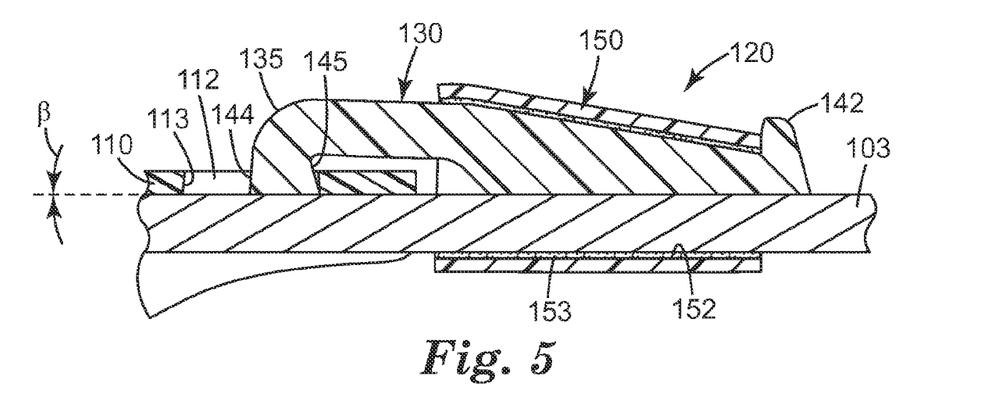
FIG. 5 is a partial sectional view of an exemplary eyewear article side shield retainer kit according to the present disclosure.

Polymeric retainer 150 may be formed from any suitable material such that polymeric retainer 150 is configured to secure spring bar 130 to temple piece 103. In some exemplary embodiments, polymeric retainer 150 may include two or more materials or combination of materials, such as an adhesive 153 at inner major surface 152. Adhesive 153 softens and bonds to spring bar 130 and/or temple piece 103 when heated.

In an exemplary embodiment, polymeric retainer 150 is a polyolefin heat shrink tube, such as EPS-200 available from 3M Co. of Saint Paul, Minn. Other suitable heat shrink tube, or other suitable materials as known in the art, and combinations thereof, may be used.

A size, material and shrink ratio, for example, of polymeric retainer 150 may be selected based on the size and geometry of spring bar 130, temple piece 103 and/or the desired force to be exerted by polymeric retainer 150. In various exemplary embodiments, polymeric retainer 150 has an initial inner diameter between approximately 1 inch and 0.25 inches, between 0.5 inches and 0.75 inches, or about 0.5 inches, and a shrink ratio of about 4:1, 3:1, 2:1, or other suitable shrink ratio. Such sizes and ratios provide a polymeric retainer 150 that may be easily handled and assembled yet provide adequate force and strength to minimize undesired movement of spring bar 130 and/or side shield 110 when secured to eyewear article 100.

Side shield retainer assembly 120 securely attaches side shield to eyewear article 100 while minimizing looseness or relative motion of polymeric retainer 150, spring bar 130, temple piece 103 and/or side shield 110 that may cause the assembly to be perceived as insecure. Polymeric retainer 150 clamps spring bar 130 to temple piece 103, for example, when heated. An adhesive 153 at an inner surface of polymeric retainer 150 bonds to spring bar 130 and temple piece 103 to provide additional security. Further, polymeric retainer 150 may conform to a shape of spring bar 130 and temple piece 103, including any ridges, depressions, textures, and/or microreplicated features 139 of spring bar 130 to optimize contact and friction between polymeric retainer 150 and spring bar 130 and temple piece 103.

Spring bar 130 may include additional features that contribute to a secure attachment. In an exemplary embodiment, spring bar 130 includes a projection 142 extending away from outer surface 131. Projection 142 provides a surface that may prevent relative movement of polymeric retainer 150 and spring bar 130, such as, for example, polymeric retainer sliding off spring bar 130.

Spring bar 130 is provided with a shape complementary to side shield and/or temple piece 103 that facilitates a secure attachment. In an exemplary embodiment, spring bar 130 includes an engagement end 135 having angled surfaces. For example, engagement end 135 includes a first angled surface 144 exhibiting a first draft angle and a second angled surface 145 exhibiting a second draft angle. One or both of first and second angled surfaces 144, 145 may interact with corresponding surfaces of side shield 110 to prevent relative motion of spring bar 130 and side shield 110. In an exemplary embodiment, side shield 110 defines an opening 112 that includes an angled surface 113 having a complementary angle. When polymeric retainer 150 secures spring bar 130 to temple piece 103, angled surface 113 is adjacent to, or at least partially in contact with, first angled surface of engagement end 135.

In an exemplary embodiment, polymeric retainer 150 clamps spring bar 130 and temple piece 103 when heated such that a diameter of polymeric retainer 150 is reduced in size. Shrinking polymeric retainer 150 by exposure to heat may limit the ability to remove polymeric retainer 150 such that a permanent attachment of side shield 110 is achieved. That is, side shields are permanently attached by side shield attachment assembly 120 and cannot be removed without damaging one or more of polymeric retainer 150, spring bar 130, temple piece 103 or side shield 110 such that one or more of the components cannot be reused in the originally intended manner. A permanently attached side shield may encourage compliance with applicable safety recommendations and may limit the ability for a user to remove a side shield and inadvertently fail to replace.

Figure 7:
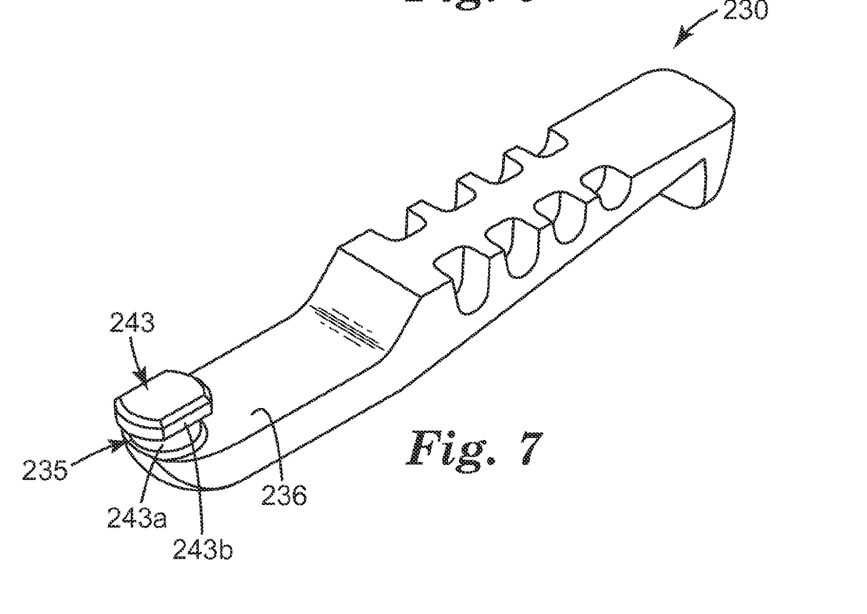
FIG. 7 is a perspective view of an exemplary spring bar having a locking tab according to the present disclosure.
Figure 8:
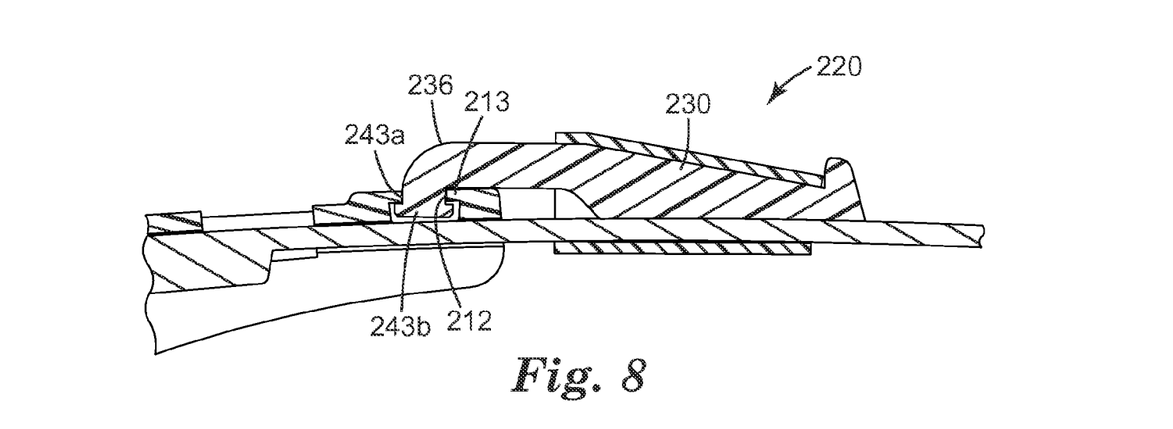
FIG. 8 is a partial sectional view of an exemplary eyewear article side shield retainer kit including a spring bar having a locking tab.

FIGS. 7 and 8 show an exemplary retainer kit 220 including a spring bar 230 having an engagement end 235 having a projection 242 that may interact with a complementary feature of side shield 210. In an exemplary embodiment, side shield 210 includes a keyed opening that facilitates a mechanical interlock. An engagement end 235 includes a first portion 243a generally extending outwardly from an arm 236 and a second portion 243b extending outwardly from first portion 243a. Second portion 243b may form a tab, for example, or other suitable shape to interact with a complementary shape of side shield 210. First and second portions 243a, 243b may thus provide additional security to limit relative movement between side shield 210 and spring bar 230 when secured by polymeric retainer 250.

In an exemplary embodiment, side shield 210 defines an opening 212 having a shape corresponding to a shape of second portion 243b. After inserting second portion 243b through opening 212, spring bar 230 may be rotated such that second portion 243b is positioned between a lip or flange 213, for example, of side shield 210 and temple piece 203 such that the engagement end 243 cannot pass through opening 212 unless rotated.

A side shield retainer assembly kit as described herein provides several features and benefits. A side shield may be assembled to an eyewear article and secured by applying heat, without the need for additional tools. Use of a polymeric retainer as described herein minimizes excessive bulk or thickness of the side shield retainer kit, especially in the space between a temple piece and a user's face, minimizing contact with a user's skin. Side shields may be attached in a highly secure and permanent manner, such that the side shields cannot be removed without damaging the side shields or one or more components of the kit. Furthermore, side shields may be attached without screws, rivets, or metallic parts that could be electrically conductive. A side shield retainer kit that is completely comprised of electrically insulating components may allow the kit to be used for a wide range of settings.

EXAMPLES

The characteristics, operation, and advantages of the present invention will be further described with regard to the following detailed non-limiting examples. These examples are offered to further illustrate the various specific and preferred embodiments and techniques. It should be understood, however that many variations and modifications may be made while remaining within the scope of the present invention.

Procedure 1: Forward Pull Retention Force

The security of a side shield retainer assembly may be characterized by a measurement of the force required to separate the spring bar from a simulated metal temple piece by pulling the spring bar in a direction towards a front of a simulated eyewear article. A spring bar having features as shown in FIG. 4 was secured to a metal mounting bar by a polymeric retainer. An EPS-200 heat shrink flexible polyolefin tubing polymeric retainer cut to a length of approximately 20 mm was positioned around the mounting bar and a sloped portion of the spring bar made of FULLCURE 950 TANGO rapid prototyping material available from Objet Geometries of Minneapolis, Minn., and having an angle $\theta$ of approximately 0°. The polymeric retainer was heated with air at approximately 120° C. using a heat gun available from Wagner SprayTech Corp. of Plymouth, Minn. until the polymeric retainer shrunk to secure the spring bar to the mounting bar.

The assembly was positioned in an Instron tensile machine, and a force applied to the engagement end of the spring bar with a pull speed of 100 mm per minute. Force was measured using a CHATILLON DFX 100 force gauge available from AMETEK, Inc. The force was increased until the spring bar broke or the polymeric retainer slipped off the simulated temple.

Examples 1 Through 15

Examples 1 through 15 were measured according to Procedure 1. Table 1 provides the measured force of Examples 1 through 5 which were performed with a spring bar having an angle $\phi$ of 10°. Table 2 provides the measured force of Examples 6 through 10 which were performed with a spring bar having an angle $\phi$ of 5°. Table 3 provides the measured force of Examples 11 through 15 which were performed with a spring bar having an angle $\phi$ of 0°. The spring bars of Examples 1 through 15 all had a maximum thickness between an inner surface and an outer surface of 5 mm. Three materials were used for the metal bar simulating a temple piece, and are listed in the tables below.

The average measured force of Examples 1 through 5 was 110.5 N, as compared to 90.2 N and 76.9 N for examples 6 through 10 and 11 through 15, respectively. Spring bars having a sloped portion of 10° exhibited a significantly greater maximum forward pull retention force than spring bars having sloped portions of 5° or 0° (no slope).

TABLE 1

| Example # | Mounting Bar | Size | Force |
|---|---|---|---|
| 1 | Aluminum | 6.4 × 3.2 | 116.0N |
| 2 | Chrome Steel | 6.4 × 3.2 | 98.0N |
| 3 | Steel | 6.4 × 3.2 | 117.5N |
| 4 | Steel | 6.4 × 2.3 | 112.0N |
| 5 | Steel | 6.4 × 1.6 | 109.0N |
| | Average | | 110.5N |

TABLE 2

| Example # | Mounting Bar | Size | Force |
|---|---|---|---|
| 6 | Aluminum | 6.4 × 3.2 | 90.5N |
| 7 | Chrome Steel | 6.4 × 3.2 | 84.0N |
| 8 | Steel | 6.4 × 3.2 | 89.0N |
| 9 | Steel | 6.4 × 2.3 | 91.0N |
| 10 | Steel | 6.4 × 1.6 | 96.5N |
| | Average | | 90.2N |

TABLE 3

| Example # | Mounting Bar | Size | Force |
|---|---|---|---|
| 11 | Aluminum | 6.4 × 3.2 | 75.5N |
| 12 | Chrome Steel | 6.4 × 3.2 | 77.0N |
| 13 | Steel | 6.4 × 3.2 | 79.5N |
| 14 | Steel | 6.4 × 2.3 | 77.5N |
| 15 | Steel | 6.4 × 1.6 | 75.0N |
| | Average | | 76.9N |

Procedure 2: Backwards Pull Retention Force

The security of a side shield retainer assembly may be characterized by a measurement of the force required to separate the spring bar from a simulated metal temple piece by pulling the spring bar in a direction away from a front of a simulated eyewear article. A spring bar having features as shown in FIGS. 1 through 6 was secured to a metal mounting bar by a polymeric retainer. An EPS-200 heat shrink flexible polyolefin tubing polymeric retainer cut to a length of approximately 20 mm was positioned around the mounting bar and a sloped portion of the spring bar made of FULL-CURE 950 TANGO rapid prototyping material available from Objet Geometries of Minneapolis, Minn., and having an angle θ of approximately 0°. The polymeric retainer was heated with air at approximately 120° C. using a heat gun available from Wagner SprayTech Corp. of Plymouth, Minn. until the polymeric retainer shrunk to secure the spring bar to the mounting bar.

The assembly was positioned in an Instron tensile machine. A wire loop was passed through a small hole drilled through the spring bar at an end opposite engagement end to hang the assembly in the Instron tensile machine. A force as applied to pull the loop with a pull speed of 100 mm per minute, and measured using a CHATILLON DFX 100 force gauge available from AMETEK, Inc. The force was increased until the spring bar broke or the polymeric retainer slipped off the simulated temple.

Examples 16 Through 30

Examples 16 through 30 were measured according to Procedure 2. Table 4 provides the measured force of Examples 16 through 20 which were performed with a spring bar having an angle φ of 10°. Table 5 provides the measured force of Examples 21 through 25 which were performed with a spring bar having an angle φ of 5°. Table 6 provides the measured force of Examples 26 through 30 which were performed with a spring bar having an angle φ of 0°. The spring bars of Examples 16 through 30 all had a maximum thickness between an inner surface and an outer surface of 5 mm. Three different materials were used for the mounting bar simulating a temple piece, and are listed in the tables below.

The average measured force of Examples 16 through 20 was 120.3 N, as compared to 100.6 N and 83.7 N for examples 21 through 25 and 26 through 30, respectively. Spring bars having a sloped portion of 10° exhibited a significantly greater maximum rearward pull retention force than spring bars having sloped portions of 5° or 0° (no slope).

TABLE 4

| Example # | Mounting Bar | Size | Force |
|---|---|---|---|
| 16 | Aluminum | 6.4 × 3.2 | 116.0N |
| 17 | Chrome Steel | 6.4 × 3.2 | 105.5N |
| 18 | Steel | 6.4 × 3.2 | 128.0N |
| 19 | Steel | 6.4 × 2.3 | 131.0N |
| 20 | Steel | 6.4 × 1.6 | 121.0N |
| | Average | | 120.3N |

TABLE 5

| Example # | Mounting Bar | Size | Force |
|---|---|---|---|
| 21 | Aluminum | 6.4 × 3.2 | 114.0N |
| 22 | Chrome Steel | 6.4 × 3.2 | 94.0N |
| 23 | Steel | 6.4 × 3.2 | 102.0N |
| 24 | Steel | 6.4 × 2.3 | 98.5N |
| 125 | Steel | 6.4 × 1.6 | 94.5N |
| | Average | | 100.6N |

TABLE 6

| Example # | Mounting Bar | Size | Force |
|---|---|---|---|
| 26 | Aluminum | 6.4 × 3.2 | 94.5N |
| 27 | Chrome Steel | 6.4 × 3.2 | 77.0N |
| 28 | Steel | 6.4 × 3.2 | 80.0N |
| 29 | Steel | 6.4 × 2.3 | 82.5N |
| 30 | Steel | 6.4 × 1.6 | 84.5N |
| | Average | | 83.7N |

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures. Any feature or characteristic described with respect to any of the above embodiments can be incorporated individually or in combination with any other feature or characteristic, and are presented in the above order and combinations for clarity only.

What is claimed is:

1. An eyewear article side shield retainer kit, comprising:
a spring bar including first and second engagement surfaces and an outer surface including a sloped portion; and
a cylindrical polymeric retainer having an outer major surface and an inner major surface and positionable around at least a portion of the sloped portion of the spring bar and an eyewear article temple piece such that the inner major surface of the polymeric retainer contacts the sloped portion;
wherein the first and second engagement surfaces are configured to contact an outer surface of the eyewear article temple piece, and
wherein the first engagement surface is configured to contact the outer surface of the eyewear article temple piece through an opening in a spectacle side shield, and
wherein the polymeric retainer is configured to press the first engagement surface and the second engagement surface against the outer surface of the eyewear article temple piece, upon exposure to heat while the polymeric retainer is positioned around the at least a portion of the sloped portion, to retain the spectacle side shield in position on the eyewear article temple piece, and
wherein the spring bar includes a protrusion extending outwardly from the outer surface of the spring bar and configured to prevent movement of the polymeric retainer relative to the spring bar and in a direction away from the first engagement surface.

2. The kit of claim 1, wherein the sloped portion has an angle $\phi$ relative to the first engagement surface, and $2°<\phi<15°$.

3. The kit of claim 2, wherein $5°<\phi<12°$.

4. The kit of claim 1, wherein the spring bar has an inner surface, the inner surface comprising the first and second engagement surfaces, and
wherein the first engagement surface is separated from the second engagement surface by a gap that is configured to receive a portion of the spectacle side shield.

5. The kit of claim 4, wherein the polymeric retainer is configured, upon exposure to heat while the polymeric retainer is positioned around the at least a portion of the sloped portion, to extend around a portion of the gap.

6. The kit of claim 1, wherein the spring bar is configured such that an angle between the first engagement surface and the outer surface of the eyewear article temple piece, when the spring bar is pressed against the outer surface of the eyewear article temple piece to retain the spectacle side shield, is not more than three degrees, the angle being in a plane that is normal to the first engagement surface and includes a longitudinal axis of the spring bar.

7. The kit of claim 1, wherein both of the spring bar and the polymeric retainer are electrically insulating.

8. The kit of claim 1, wherein the spring bar is made from a material having a flexural modulus of between 2000 MPa and 6000 MPa.

9. The kit of claim 1, wherein the kit is configured to permanently attach the spectacle side shield to an eyewear article that includes the eyewear article temple piece.

10. The kit of claim 1, wherein the inner major surface of the polymeric retainer comprises an adhesive.

11. The kit of claim 1, wherein the polymeric retainer comprises a heat shrinkable tube.

12. The kit of claim 1, wherein the polymeric retainer has a length between 10 mm and 40 mm.

13. The kit of claim 1, further comprising the spectacle side shield.

14. The kit of claim 13, wherein the spring bar is integrally formed with the spectacle side shield.

15. The kit of claim 1, wherein the spring bar includes an engagement end having a projection configured to be positioned between the eyewear article temple piece and the spectacle side shield when the spring bar is secured to the eyewear article temple piece.

16. The kit of claim 1, wherein the first engagement surface of the spring bar is configured to have a first angle $\theta$ relative to the second engagement surface immediately before the exposure of the polymeric retainer to heat and to have a second angle $\beta$ relative to the second engagement surface after the exposure of the polymeric retainer to heat, and wherein $\theta$ is greater than $\beta$ and $\beta$ is less than seven degrees.

17. The kit of claim 5, wherein the protrusion is at an end of the sloped portion which is farthest from the first engagement surface.

18. The kit of claim 1, wherein the spring bar comprises a single continuous piece having the sloped portion and both of the first and second engagement surfaces.

19. A method for retaining a spectacle side shield on an eyewear article, comprising:
positioning the spectacle side shield and a spring bar proximate an eyewear article temple piece of the eyewear article, the spring bar including first and second engagement surfaces and an outer surface including a sloped portion, with the first engagement surface contacting an outer surface of the eyewear article temple piece through an opening in the spectacle side shield;
positioning a cylindrical polymeric retainer around at least a portion of the sloped portion of the outer surface of the spring bar and a portion of the eyewear article temple piece; and
shrinking the polymeric retainer to secure the spring bar to the eyewear article temple piece to retain the spectacle side shield in position on the eyewear article temple piece,
wherein, during the shrinking, the spring bar is positioned such that the first and second engagement surfaces contact the outer surface of the eyewear article temple piece, and
wherein the spring bar includes a protrusion extending outwardly from the outer surface of the spring bar and configured to prevent movement of the polymeric retainer relative to the spring bar and in a direction away from the first engagement surface.

20. The method of claim 19, wherein the step of shrinking the polymeric retainer comprises heating the polymeric retainer.

21. The method of claim 19, wherein the polymeric retainer comprises a generally cylindrical shape having an outer major surface and an inner major surface, the inner major surface comprising an adhesive.

22. The method of claim 19, wherein an angle between the first engagement surface and the second engagement surface has a first value $\theta$ immediately before the shrinking and a second angle $\beta$ after the shrinking, and wherein $\theta$ is greater than $\beta$ and $\beta$ is less than seven degrees.

23. The method of claim 19, wherein the spring bar comprises a single continuous piece having the sloped portion and both of the first and second engagement surfaces.

* * * * *